M. GASSER.
SURVEYING INSTRUMENT.
APPLICATION FILED JAN. 7, 1911.
1,025,911.
Patented May 7, 1912.
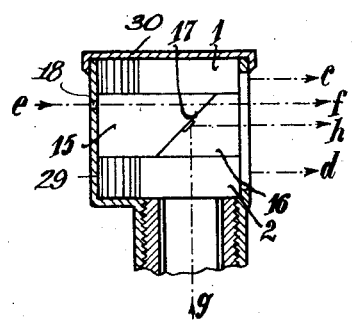
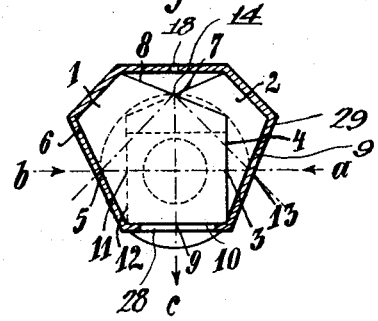
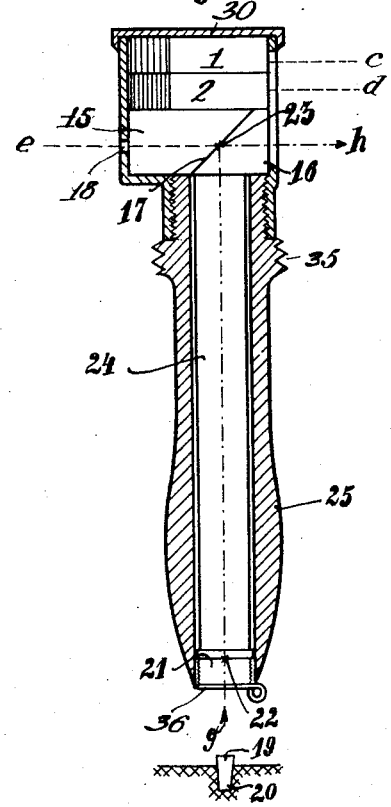
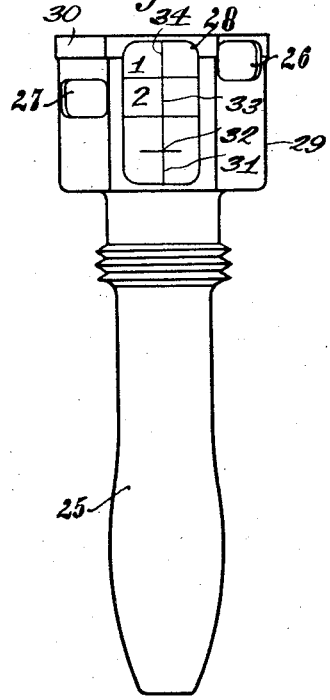
Witnesses:
Inventor:

UNITED STATES PATENT OFFICE.

MAX GASSER, OF DARMSTADT, GERMANY, ASSIGNOR TO AKTIENGESELLSCHAFT HAHN FÜR OPTIK UND MECHANIK, OF IHRINGSHAUSEN, NEAR CASSEL, GERMANY.

SURVEYING INSTRUMENT.

1,025,911. Specification of Letters Patent. Patented May 7, 1912.

Application filed January 7, 1911. Serial No. 601,437.

*To all whom it may concern:*

Be it known that I, MAX GASSER, a citizen of the Empire of Germany, residing at Darmstadt, in the Empire of Germany, have invented a new and useful Surveying Instrument, of which the following is a specification.

In surveying frequently prisms are utilized for horizontally projecting any object to a given base, that is a straight line connecting two pickets driven into the soil. In spite of numerous combinations of prisms and modifications made in same it was hitherto not possible to simultaneously observe the two pickets on the right and on the left, the object at the rear and the vertex of the right angle below, in other words, the point where the normal from the object crosses the base. My invention relates to a simple surveying instrument, which is capable of satisfying this condition.

The new instrument comprises two pentagonal prisms for observing the two pickets, a prism with a reflecting face making an angle of 45° with the vertical for the picket below, and a casing inclosing these prisms.

I will now proceed to describe my invention with reference to the accompanying drawing, in which—

Figure 1 is a vertical longitudinal section through the upper part of the surveying instrument in a plane passing through the object and the eye of the surveyor, the superposed prisms being shown in elevation, Fig. 2 is a horizontal section through the line $e$—$h$ in Fig. 3, all of the superposed prisms being shown in a plan view, Fig. 3 is a vertical longitudinal section similar to Fig. 1 through a modified surveying instrument and shows also the lower picket indicating the vertex of the right angle, and Fig. 4 is a front view of the same.

Similar characters of reference refer to similar parts throughout the several views.

The surveying instrument is shown to consist of a casing proper 29, two pentagonal prisms 1 and 2, and two prisms 15 and 16, a cover 30 and a hollow handle 25 with a glass disk 21 at the lower end. The casing 29 is so shaped that the two pentagonal prisms 1 and 2 can be lodged in it. The two prisms 15 and 16 are preferably employed for filling up the space in the casing and may be considered to be the two parts of a pane of glass divided in a plane 17 making an angle of 45° with the vertical. It does not matter, in what order the several prisms are superposed in the casing 29. In Fig. 1 the pair of prisms 15 and 16 is shown to be placed in the middle between the two pentagonal prisms 1 and 2, while in Figs. 2, 3 and 4 the two pentagonal prisms 1 and 2 are shown to be directly superposed and placed on the pair of prisms 15 and 16. The inclined face 17 of the front prism 16 is turned downward and may be coated with silver, a small circular hole 23 in the axis of the handle 25 being left in this coat, as is assumed for Fig. 3. Or only a small circular spot on the face 17 (in place of the hole 23) may be coated with silver, as is assumed in Fig. 1. The casing 29 is at the rear provided with a small hole or sight 18 in the vertical central plane of the instrument, this hole 18 being disposed either in the horizontal line $e$—$h$ passing through the small hole 23 in the silver coat for Fig. 3 or above or beneath the horizontal line passing through the small circular coat of silver for Fig. 1. The casing 29 has two lateral openings 26 and 27 (Fig. 4) for the two pentagonal prisms 1 and 2 respectively and a large opening 28 in the front side. The front face of the front prism 16 is provided with a cross-hair 31, 32 in line with the small circular hole 23 in the silver coat on the face 17 for Fig. 3 or with the small circular silver coat on the said face for Fig. 1. The front faces of the two pentagonal prisms 1 and 2 are respectively provided with vertical mark lines 33 and 34, which are made to coincide with the vertical line 31 of the cross-hair.

The hollow handle 25 may be screwed into the casing 29, as is shown, or therein fastened in any other known manner. Preferably the handle 25 is provided with a suitably shaped collar 35, which can engage in a corresponding recess of a tripod (not shown), so that the instrument can be therein turned with the hand. Where so preferred, the collar 35 may be externally screw-threaded for engaging a corresponding thread in the tripod. A circular glass disk 21 with parallel faces may be fitted in the lower end of the handle 25 for hermetically closing its interior. This window 21 may be shut with a turnable lid 36, if so preferred. In all cases the glass disk 21 is provided, preferably on its upper face, with a mark 22 or cross-hair.

When the tripod carrying the instrument described is so positioned as to bring the latter into the correct position, then a ray of light $a$ (Fig. 2) passing from the picket on the right through the opening 26 will impinge at the point 3 upon the right face 4 of the pentagonal prism 1, which is at right angles to the ray, so that the ray $a$ is not deflected, but passes on in the same line, until it strikes the left inclined face 6 at the point 5, where it is so reflected as to strike the opposite face 8 at the point 7, from whence it is again reflected in the direction of $c$, so that it passes through the front face 10 in a point in the vertical mark line 34 and can meet the eye of the surveyor. At the same time a ray of light $b$ passing from the opposite picket on the left through the opening 27 will impinge at the point 11 upon the left face 12 of the other pentagonal prism 2, whereupon it passes on in the same line, until it strikes the right inclined face 9 at the point 13, where it is so reflected as to strike the opposite face at the point 14 in the same vertical line, where the point 7 of the upper prism 1 lies. From the point 14 the said ray is again reflected in the direction of $d$ (lying in the vertical plane of the ray $c$ and the mark lines 31, 33, 34), so that it passes through the front face of the prism 2 and can meet the eye. At the same time also a ray of light $e$ (Fig. 1) passing from an object in front of the observer through the sight 18 and the two prisms 15 and 16 will leave the front face of the front prism 16 in the direction of $h$ in Fig. 3 or $f$ in Fig. 1 and can meet the eye. At last a vertical ray of light $g$ (Fig. 3) passing upward from the mark 19 on the picket 20 (marking the vertex of the above mentioned right angle) will strike the inclined face 17 in the small circular hole 23 in the coat of silver for Fig. 3 or on the small circular coat of silver for Fig. 1, in which latter case the said ray $g$ is reflected to the front, so that it leaves the front face of the front prism 16 in the direction of $h$.

From the above explanations it will be evident, that the tripod with the instrument requires to be so placed as to make the images of the mark 19 on the lower picket 20 and of the mark 22 on the disk 21 coincide with the cross-hair 31, 32 and to make the images of the marks on the two pickets on the right and left, and of the object coincide with the vertical mark line 31, 33, 34. Then the instrument and thereby the mark 19 of the lower picket 20 will be in the vertical plane passing through the two pickets on the right and left and at the same time also in the vertical plane passing through the object, the two planes being at right angles to one another.

The surveying instrument described can be varied in many respects without departing from the spirit of my invention. The prism 15 may be replaced by an inclined mirror, the prism 16 may be replaced by a window, and the ray of light $e$ from the object may be permitted to pass through a space in the casing 29. Or two panes of glass may be employed above and beneath the two pentagonal prisms, so as to permit the ray of light $e$ from the object to pass through either of them.

I claim:

1. In a surveying instrument, the combination with two pentagonal prisms so superposed, as to place their front faces in the same vertical plane and their adjoining faces at right angles to the front faces in two parallel vertical planes, of a part having a reflecting face inclined to the front and downward at an angle of forty-five degrees to the vertical, and a casing inclosing said two pentagonal prisms and said part and comprising a vertical tube whose axis passes through the middle of the reflecting face of said part, said casing having at the rear an opening for sighting the object, on the sides two openings, one for the face of each prism at right angles to the front face, and at the front an opening extending over said two prisms and said part.

2. In a surveying instrument, the combination with two pentagonal prisms so superposed, as to place their front faces in the same vertical plane and their adjoining faces at right angles to the front faces in two parallel vertical planes, of a first part having a reflecting face inclined to the front and downward at an angle of forty-five degrees to the vertical, a second part filling up the space behind said first part, and a casing inclosing said two pentagonal prisms and said two parts and comprising a vertical tube whose axis passes through the middle of the reflecting face of said first part, said casing having at the rear an opening for sighting the object, on the sides two openings, one for the face of each prism at right angles to the front face, and at the front an opening extending over said two prisms and said first part.

3. In a surveying instrument, the combination with two pentagonal prisms so superposed, as to place their front faces in the same vertical plane and their adjoining faces at right angles to the front faces in two parallel planes, of a first prism having a reflecting face inclined to the front and downward at an angle of forty-five degrees to the vertical, a second prism filling up the space behind said first prism, and a casing inclosing said two pentagonal prisms and said two prisms and comprising a vertical tube whose axis passes through the middle of the reflecting face of said first prism, said casing having at the rear an opening for sighting the object, on the sides two openings, one for the face of each pentagonal prism at right angles to the front face, and at the front an opening extending over said two pentagonal prisms and said first prism.

4. In a surveying instrument, the combination with two pentagonal prisms so superposed, as to place their front faces in the same vertical plane and their adjoining faces at right angles to the front faces in two parallel vertical planes, of a part having a reflecting face inclined to the front and downward at an angle of forty-five degrees to the vertical, a casing inclosing said two pentagonal prisms and said part and comprising a vertical tube whose axis passes through the middle of the reflecting face of said part, and a glass disk at the lower end of said tube having a sighting-mark, the reflecting face of said part having a sighting-mark, said two pentagonal prisms having on their front faces sighting-marks and said casing having at the rear a sight opening for sighting the object, on the sides two openings, one for the face of each prism at right angles to the front face, and at the front an opening extending over said two prisms and said part.

5. In a surveying instrument, the combination with two pentagonal prisms so superposed, as to place their front faces in the same vertical plane and their adjoining faces at right angles to the front faces in two parallel vertical planes, of a first part having a reflecting face inclined to the front and downward at an angle of forty-five degrees to the vertical, a second part in front of said first part having a sighting-mark on its front face, a casing inclosing said two pentagonal prisms and said two parts and comprising a vertical tube whose axis passes through the middle of the reflecting face of said first part, and a glass disk at the lower end of said tube having a sighting-mark, the reflecting face of said first part having a sighting-mark, said two pentagonal prisms having on their front faces sighting-marks, and said casing having at the rear a sight opening for sighting the object, on the sides two openings, one for the face of each prism at right angles to the front face, and at the front an opening extending over said two prisms and said second part.

6. In a surveying instrument, the combination with two pentagonal prisms so superposed as to place their front faces in the same vertical plane and their adjoining faces at right angles to the front faces in two parallel vertical planes, of a first prism having a reflecting face inclined to the front and downward at an angle of forty-five degrees to the vertical, a second prism forming with said first prism a pane and having on its front face a sighting-mark, a casing inclosing said four prisms and comprising a vertical tube whose axis passes through the middle of the reflecting face of said first prism, and a glass disk at the lower end of said tube having a sighting-mark, the reflecting face of said first prism having a sighting-mark, said two pentagonal prisms having on their front faces sighting-marks, and said casing having at the rear a sight opening for sighting the object, on the sides two openings, one for the face of each pentagonal prism at right angles to the front face, and at the front an opening extending over said two pentagonal prisms and said second prism.

In testimony whereof I have signed my name to this specification in the presence of two subscribing witnesses.

MAX GASSER.

Witnesses:
WILHELM DOBLEN,
SOPHIE ENGELAND.